Patented Aug. 10, 1943

2,326,472

UNITED STATES PATENT OFFICE 2,326,472

METHOD RELATING TO PROTECTING PLANTS AND THE LIKE AND TO PRODUCING MEANS FOR SUCH PURPOSES

Sven Vilhelm Lundbäck, Stockholm, and Bertil Henrik Emanuel Nilsson, Skelleftehamn, Sweden, assignors to Bolidens Gruvaktiebolag, Stockholm, Sweden, a joint-stock company limited of Sweden No Drawing. Application February 10, 1939, Serial No. 255,776

3 Claims. (Cl. 167—14)

This invention applies to the preparation and use of new types of arsenical compounds for the purpose of spraying and dusting plants as a protection against injurious insects, fungi and rot.

For the purpose of controlling biting insects lead arsenate has for many years been used as the foremost and best means, applied as a spray and as a dust. The use of lead arsenate for such purposes is, however, combined with a serious danger to the health on account of its high content of lead. If ingested, even in extremely trifling quantities, the lead may in time affect the health, as it accumulates in the human body, and may cause a condition of serious illness without evidencing any distinct symptoms of poisoning. The arsenic which is simultaneously absorbed with the lead need not be considered as dangerous as the lead in the small quantities here involved and can be removed from the body in a short space of time.

The danger of poisoning has resulted in many regulations concerning the maximum quantity of lead that may be tolerated on fruit, which has caused much trouble for the export and import trade of certain kinds of fruit.

In view of this, many attempts have previously been made to produce arsenates of other metals than lead with the same good properties and qualities as lead arsenate for spraying and dusting purposes. In this respect, arsenate of zinc has been considered as possessing particularly great possibilities. All these attempts have failed, partly through the tendency of this salt under certain conditions to cause so-called burns on the sprayed parts of plants, and partly by reason of the unsuitable physical properties of arsenate of zinc.

This invention applies to a method for protecting plants and the like against injurious insects, fungi and rot by using for spraying and dusting purposes fluorine arsenates, of zinc, difficult of solution.

These fluorine arsenates can be made with a very low content of water-soluble arsenic and, by reason of their insolubility and stability under the influences of the moisture and the carbonic acid of the atmosphere, are harmless to plants. As they can be produced with physical and chemical properties very suitable for spraying and dusting purposes, and since they have a good action against biting insects they are equal and in many cases superior to lead arsenate. It is possible to use these compounds for spraying purposes in combination with other fungicides such as lime sulphur and Bordeaux mixture, without the disadvantage of decomposition and injury to the plants.

In order to produce such compounds with the foregoing and other desired properties it is necessary that the process be caused to take place in the wet way according to a method developed by the present inventors. This method is characterized in that a suspension of suitable composition is made from arsenic acid or a soluble salt of the same, a compound of zinc, and a soluble fluorine compound, which mixture after the reaction has finished is neutralized by addition of a suitable metal compound, which may be added in excess.

The analysis of these compounds varies within certain limits according to the amounts of the materials used in the process. For the fluorine arsenates of zinc suitable products have been prepared with analyses ranging between the following limits:

|  | Per cent |
|---|---|
| $As_2O_5$ | 25–45 |
| $ZnO$ | 45–65 |
| $F$ | 0.1–4 |

By the use of this method zinc fluorine arsenates can be produced which are very light, and which settle slowly in suspension, and their content of water soluble arsenic acid can easily be reduced to less than 0.1%.

As an example of this method there may be mentioned the following process of making a zinc fluorine arsenate with a low percentage of fluorine: 27 kg. arsenic acid is dissolved in 750 litres of water while it is being stirred and heated to 90° C. 30 kg. zinc oxide is then added, all at the same time, to the solution. After ¼ hour 0.25 kg. sodium fluoride is added, after which the mixture is vigorously stirred for one hour at the same temperature while the reaction takes place. 16 kg. zinc oxide is then added. The same temperature is held, and the mixture is stirred for ½ hour in order that a precipitate of zinc fluorine arsenate of a very fine crystalline structure may be obtained. The precipitate is then filtered, washed, dried, and ground. The product resulting from this procedure has been found to have the following analysis in per cent by weight:

| | |
|---|---|
| $As_2O_5$ | 31.1 |
| Water soluble $As_2O_5$ | 0.02 |
| $F$ | 0.18 |
| Volume gr. per $cm^3$ | 0.13 |

In carrying out the process of making zinc fluorine arsenate according to this example, the order of addition of the different reactants may be reversed in such a way that the first charge of zinc oxide is suspended in water together with the sodium fluoride and vigorously stirred at a temperature of 30° C. The whole amount of arsenic acid is then added, and the temperature is raised to 90° C. After some time, e. g. one hour, the last part of zinc oxide is added.

As previously stated, these zinc fluorine arsenates may advantageously be mixed with other fungicides commonly used for plant protection. They may also be used with contact poison insecticides. This invention applies also to the use of these zinc fluorine arsenates combined with such other agents into one commercial product for plant spraying or dusting purposes.

This application is a continuation-in-part of our prior application Serial No. 173,690 filed November 9, 1937.

Having thus described our invention we declare that what we claim is:

1. Method for protecting plants and the like against injurious insects, fungi and rot, characterized by using for spraying and dusting purposes fluorine arsenates of zinc.

2. Method of making fluorine arsenates of zinc possessing physical and chemical properties and qualities suitable for spraying and dusting purposes, characterized in that a suspension is made from a compound of the group consisting of arsenic acid and a soluble salt of the same, a compound of zinc and a soluble fluorine compound, the mixture being neutralized after the reaction is finished by further addition of a metal compound, which may be added in excess.

3. Fluorine arsenates of zinc.

SVEN VILHELM LUNDBACK.
BERTIL HENRIK EMANUEL NILSSON